United States Patent
Li et al.

(10) Patent No.: US 10,209,765 B2
(45) Date of Patent: Feb. 19, 2019

(54) METHOD FOR ACHIEVING LOW POWER CONSUMPTION OF THREE-DIMENSIONAL MEASUREMENT CHIP

(71) Applicant: NANJING HUAJIE IMI TECHNOLOGY CO., LTD, Nanjing (CN)

(72) Inventors: Shuo Li, Nanjing (CN); Li Li, Nanjing (CN); Zan Sheng, Nanjing (CN); Gaofeng Yang, Nanjing (CN)

(73) Assignee: NANJING HUAJIE IMI TECHNOLOGY CO., LTD, Nanjing (CN)

( * ) Notice: Subject to any disclaimer, the term of this patent is extended or adjusted under 35 U.S.C. 154(b) by 0 days.

(21) Appl. No.: 15/394,853

(22) Filed: Dec. 30, 2016

(65) Prior Publication Data

US 2017/0192491 A1 Jul. 6, 2017

(30) Foreign Application Priority Data

Dec. 31, 2015 (CN) .......................... 2015 1 1028361

(51) Int. Cl.
*G06F 1/08* (2006.01)
*G06T 1/20* (2006.01)

(52) U.S. Cl.
CPC .............. *G06F 1/3293* (2013.01); *G06F 1/08* (2013.01); *G06F 1/324* (2013.01); *G06T 1/20* (2013.01); *Y02D 10/122* (2018.01); *Y02D 50/20* (2018.01)

(58) Field of Classification Search
CPC .......... G06F 1/3293; G06F 1/08; G06F 1/324; G06F 1/20; G06T 1/20; Y02D 50/20; Y02D 10/122
See application file for complete search history.

(56) References Cited

U.S. PATENT DOCUMENTS

| | | | |
|---|---|---|---|
| 8,924,758 B2 | 12/2014 | Steinman et al. | |
| 2010/0005328 A1* | 1/2010 | Rakshani | G06F 1/3203 713/322 |

(Continued)

FOREIGN PATENT DOCUMENTS

CN 101802750 8/2010

*Primary Examiner* — Austin Hicks
(74) *Attorney, Agent, or Firm* — JCIPRNET (57) ABSTRACT

The present invention includes means of using a customized coprocessor to replace a main processor to process or interact with a data processing unit in a complex scene and reducing clock frequencies of the main processor and related modules, thereby achieving low power consumption of the three-dimensional measurement chip. The present invention includes: step 1: determining a system structure of a three-dimensional measurement processing chip; step 2: classifying data processing units according to scene requirements; step 3: adding coprocessors on a system bus; step 4: designing a customized coprocessor or small data control unit; step 5: designing a semi-customized coprocessor or small data control unit; step 6: optimizing software codes and reducing a clock frequency; step 7: verifying the chip to confirm that the chip satisfies design requirements. The present invention is applicable to a plurality of integrated circuits or any internetwork system consisting of a plurality of integrated circuits.

9 Claims, 5 Drawing Sheets

(56) References Cited

U.S. PATENT DOCUMENTS

| | | | | |
|---|---|---|---|---|
| 2013/0151869 A1* | 6/2013 | Steinman | ................ | G06F 1/324 |
| | | | | 713/300 |
| 2014/0165022 A1* | 6/2014 | Stevens | ............... | G06F 17/5031 |
| | | | | 716/134 |
| 2017/0068765 A1* | 3/2017 | Sinnadurai | .......... | G06F 17/5081 |

* cited by examiner

METHOD FOR ACHIEVING LOW POWER CONSUMPTION OF THREE-DIMENSIONAL MEASUREMENT CHIP

CROSS-REFERENCE TO RELATED APPLICATION

This application claims the priority benefit of China application serial no. 201511028361.8, filed on Dec. 31, 2015. The entirety of the above-mentioned patent application is hereby incorporated by reference herein and made a part of this specification.

BACKGROUND OF THE INVENTION

Field of the Invention

The present invention relates to a System On Chip (SOC), and particularly to a design method for achieving low power consumption of a three-dimensional measurement chip.

Description of Related Art

An SOC with low power consumption can not only improve a battery life of a handheld communication apparatus, but also reduce the complexity of a heat dissipation system and the cost of the overall design. Therefore, research in low power consumption of an SOC is always a key subject in the industry. In a low power consumption solution well-known in the engineering field at present, a low power consumption requirement is satisfied mainly through methods such as algorithm optimization, clocking gating, power gating, dynamic voltage and frequency scaling. However, the methods are only basic assumptions of reducing power consumption, but cannot be specifically applied to actual circuit design.

"APPARATUS AND METHOD FOR REDUCING POWER CONSUMPTION OF SYSTEM ON CHIP" is disclosed in China patent application No. 200880106433. In the method, a Power Management Unit (PMU) is used to, when detecting that a chip goes into a sleep state from an active state, stop generating a clock provided to a Central Processing Unit (CPU) and store register information of the CPU included in the SOC and peripheral equipment, and when detecting that the chip goes into the active state from the sleep sate, restore the clock and resume the work of the overall system according to the register information. In the solution, power consumption of a chip can be saved through a sleep method. However, the solution has the following obvious disadvantages. First, classification of work states of the module is too simple such that only the active state and the sleep state exist, and how to detect the active state of the chip is not described; second, if the SOC is a chip required to work for a long time, such as a communication network chip, the PMU detects that the chip is in the active state all the time and the clock and power for the CPU cannot be turned off.

"METHOD FOR SOC PERFORMANCE AND POWER OPTIMIZATION" is disclosed in U.S. Pat. No. 8,924,758 B2, where a PMU manages a CPU and a Graphics Processing Unit (GPU) at the same time. Belonging to different processing cores and states, the CPU and the GPU are applicable to different processing loads, and thus select different power consumption according to different processing loads. In the solution, power consumption can be saved through different loads. However, the solution has the following obvious disadvantages. Since a complex accelerated processing unit (including a CPU and a GPU) is used, the processing of the PMU for the SOC becomes very complex. Therefore, design difficulty and power consumption of the PMU are increased, and the low power consumption design does not have a practical value for a three-dimensional measurement chip of an Application Specific Integrated Circuit (ASIC) with an overall chip scale smaller than that of the APU.

SUMMARY OF THE INVENTION

The objective of the present invention is to provide a design method for achieving low power consumption of a three-dimensional measurement chip, to overcome the disadvantages in the prior art. In the present invention, on the basis of frequencies of intervention, modification and interaction of a main processor for different processing modules in a measurement process, different data processing units are classified in different processing scenes, special coprocessors or small control units are added to provide customized services for the data processing units, and a frequency of the main processor is reduced by reducing work loads of the main processor, thereby reducing power consumption of the whole chip while satisfying overall performance requirements. The data processing units are processors, which are used for a special function, e.g. image processing.

A method for achieving low power consumption of a three-dimensional measurement chip according to the present invention includes means of using a customized coprocessor to replace a main processor to process or interact with a data processing unit in a complex scene and reducing clock frequencies of the main processor and related modules, thereby achieving low power consumption of the three-dimensional measurement chip, the method including the following basic steps:

Step 1: determining a system structure of a three-dimensional measurement processing chip, where the system structure includes a main processor, a main storage, and data processing units, connected to each other by a standard system bus, an interface distributed to the main processor is a master interface, and interfaces distributed to other modules are slave interfaces;

Step 2: classifying the data processing units according to scene requirements, where the data processing units are classified into high frequency modules A, medium frequency modules B and C, and low frequency modules D according to conditions such as interaction or calculation loads borne by the main processor, where the high frequency module A is served by a customized coprocessor or small data control unit E in a one-to-one manner, the medium frequency modules B and C are served by a semi-customized coprocessor or small data control unit F in a many-to-one manner, and the low frequency module D is served by the main processor;

step 3: adding coprocessors on the system bus, where the coprocessors or small data control units E and F are added on the system bus, are capable of accepting slave interfaces configured by the main processor, and have master interfaces for configuring the high frequency modules A and the medium frequency modules B and C;

step 4: designing a customized coprocessor or small data control unit, where a circuit structure of the customized coprocessor or small data control unit E is designed, with reference to an entry mode and processing process of the main processor for processing the high frequency module A, an entry mode signal and data are extracted and sent to the customized coprocessor or small data control unit E, and the customized coprocessor or small data control unit E calculates the data and generates a processing timing similar to that of the main processor for the high frequency module A, to complete the whole process allocated to the high frequency module A;

step 5: designing a semi-customized coprocessor or small data control unit, where a circuit structure of the semi-customized coprocessor or small data control unit F is designed, and according to requirements of step 3, considering configuration operations for the medium frequency modules B and C, a semi-common instruction is generated;

step 6: optimizing software codes and reducing a clock frequency, where in the software codes, processing programs of the main processor for the high frequency module A and the medium frequency modules B and C are closed, and a clock frequency of the main processor is reduced correspondingly according to a reduction of work loads of the main processor; and step 7: verifying the chip to confirm that design requirements are satisfied, where simulation verification is performed on the chip system through an Electronic Design Automation (EDA) technology, to ensure the correctness of functions.

The implementation principle of the present invention is as follows. The present invention provides a method for achieving low power consumption of a three-dimensional measurement chip. An SOC of the three-dimensional measurement chip includes a main processor, a Read-Access Memory (RAM), a Read-only Memory (ROM), a bus structure, several coprocessors, and several data processing units. Since the three-dimensional measurement chip belongs to an ASIC, the data processing units generally further includes a color image operation module, a depth image generating module, a data packaging module, and the like. In the present invention, different clock domains are divided according to different performance of the three-dimensional measurement chip at the beginning of the design, to satisfy different performance requirements. In the same way, in the case that no coprocessor is included, the data processing units are classified into the following three levels according to processing frequencies of the main processor for different processing units and corresponding loads: high access frequency modules, medium access frequency modules, and low access frequency modules. The high access frequency data processing unit needs to be accessed by and interact with the main processor frequently. The low access frequency data processing unit is accessed by and interacts with the main processor with a very low frequency. The medium access frequency data unit has an interaction frequency between the interaction frequency of the high access frequency data processing unit and the interaction frequency of the low access frequency data processing unit. If the main processor interacts with the high access frequency data module, loads of the main processor are greatly increased. Therefore, in order to obtain better processing performance, the main processor necessarily adopts measures such as increasing a main frequency, resulting in a power consumption increase. In the present invention, a one-to-one customized coprocessing mode is used, that is, an exclusive coprocessor and a special instruction customization service of the coprocessor are used to unload a part of work of the main processor. The low access frequency data processing unit can be operated by the main processor, and a corresponding coprocessor is kept in a sleep state or has its hardware resources omitted. For the medium access frequency data processing unit, if a burst operation exists or an access frequency is high in a period of time, the coprocessor takes over related operations to reduce the frequency of the main processor, and when the processing work loads are reduced, the main processor takes over the work to make the coprocessor sleep. In the present invention, the coprocessors can be matched with the data processing units flexibly. A high access frequency data processing unit with special instructions is matched with a special coprocessor. Multiple medium access frequency data processing units can be controlled and processed by one coprocessor, where the coprocessor serves different data units in order according to different time slices.

Compared with the prior art, the present invention has the following significant advantages.

First, a coprocessor or small control unit provides a customized control and processing service for a data processing unit. According to the three-dimensional measurement chip implemented in the solution, the coprocessor may be a very small control unit, which requires a few logic resources, thus can implement a powerful function at a very low cost, and is triggered by some signals to perform configuration, perform special calculation, allocate a calculated value to the data processing unit, or interact with the data processing unit.

Second, in a scene of multiple clock domains, in order to satisfy high performance and low power consumption, a high-speed processing part of a data processing module runs in a higher clock domain, and a part for interacting with a coprocessor runs in a lower clock domain. In this way, the coprocessor can also run in the lower clock domain.

Third, in a processing scene with a lower performance requirement, for example, in a low resolution, low frame rate, or static image scene, a data processing unit can run in the low frequency clock domain, satisfying the performance requirement while ensuring low power consumption.

Fourth, the present invention saves power consumption through combination of software and hardware with reference to a specific application scene for an access frequency. From the angle of hardware design, a coprocessor or small control unit can be fully used to bypass related partial work without adding too many hardware units. The present invention is applicable to a plurality of integrated circuits or any internetwork system consisting of a plurality of integrated circuits.

DETAILED DESCRIPTION OF THE INVENTION

The detailed implementation of the present invention is further described below in detail with reference to the accompanying drawings and embodiments.

Figure 1:
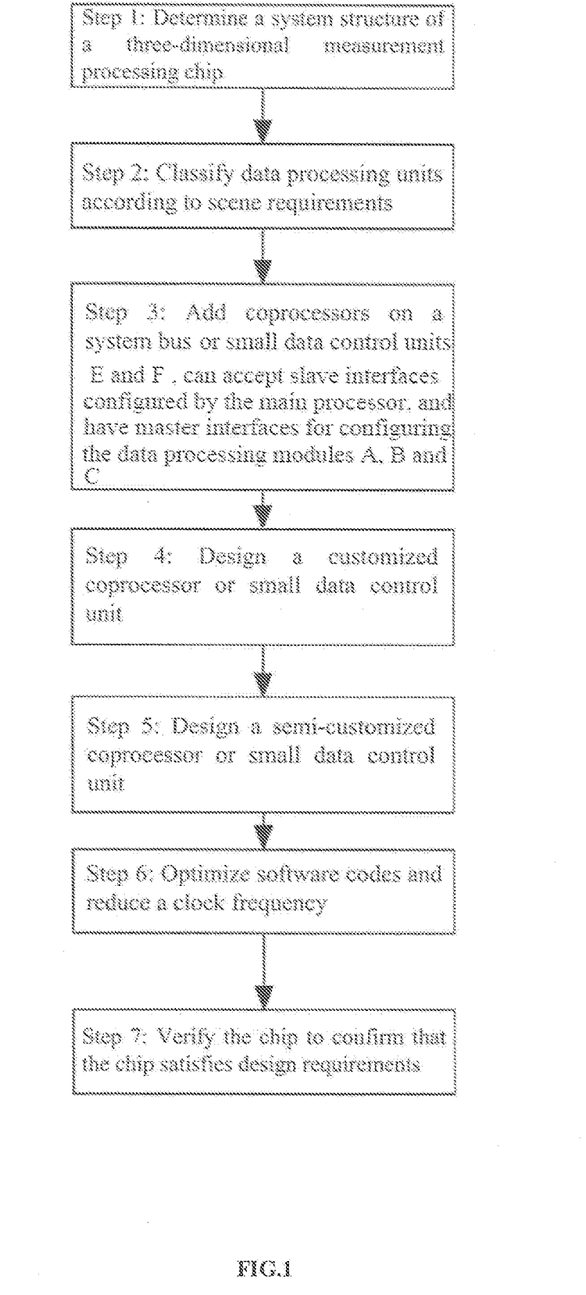
FIG. 1 is a schematic flow chart of a method for achieving low power consumption of a three-dimensional measurement chip provided by the present invention.

Referring to FIG. 1, the present invention provides a method for achieving low power consumption of a three-dimensional measurement chip, including means such as using a customized coprocessor to replace a main processor to process or interact with a data processing unit in a complex scene and reducing clock frequencies of the main processor and related modules, thereby achieving low power consumption of the three-dimensional measurement chip, the method including the following detailed steps:

Step 1: A system structure of a three-dimensional measurement processing chip is determined. The system structure includes a main processor, a main storage, and data processing units, connected to each other by a standard system bus. An interface distributed to the main processor is a master interface, and interfaces distributed to other modules are slave interfaces. The main processor includes a single-core processor or a multi-core processor, that is, a processor with different cores. The data processing units include a color image processing module, a depth image generating module, an image compressing module, an image packaging module, a pre-processing module, and post-processing module, where instructions or codes are stored in the memory, which may be loaded and executed by the main processor or co-processor, to proceed with the image processing. The detailed design is as follows.

Figure 2:
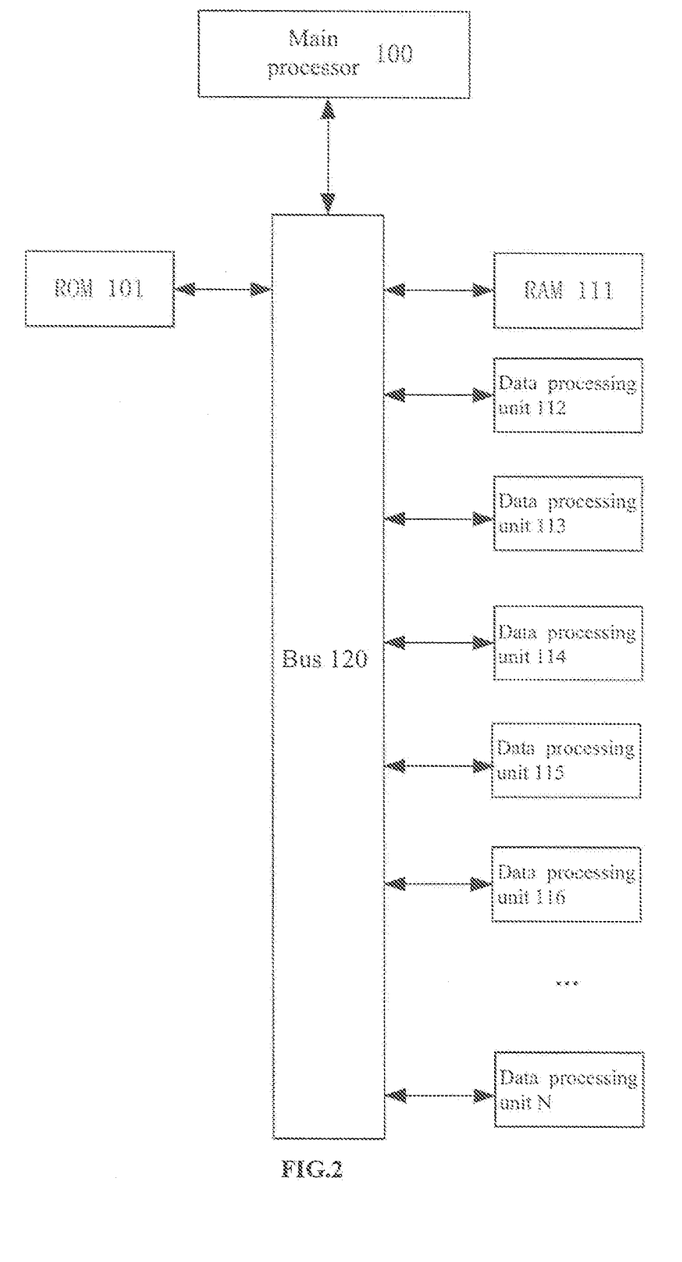
FIG. 2 is a schematic diagram of a system structure of a three-dimensional measurement chip before optimization.

FIG. 2 is a schematic diagram of a system structure of a primary three-dimensional measurement chip. Referring to FIG. 2, an SOC includes a main processor 100, a ROM 101, a RAM 111, data processing units 112-116, and a data processing unit N. The modules are connected to the main processor through a bus 120. An interface between the main processor 100 and the bus 120 is a master interface, and interfaces between other modules and the bus 120 are slave interfaces. The main processor may be a single-core processor, a multi-core processor, or a processor with different cores, to satisfy the requirement of high cost performance. In the present embodiment, for the data processing units 112-116 controlled by the main processor 100 in the three-dimensional measurement chip, the data processing unit 112 is a depth image generating module, the data processing unit 113 is an image packaging module, the data processing unit 114 is a color image processing module, the data processing unit 115 is a data packet output module, and the data processing unit 116 is a post-processing module.

Step 2: The data processing units are classified according to scene requirements. The data processing units are classified into high frequency modules A, medium frequency modules B and C, and low frequency modules D according to conditions such as interaction or calculation loads borne by the main processor. The high frequency module A is served by a customized coprocessor or small data control unit E in a one-to-one manner; the medium frequency modules B and C are served by a semi-customized coprocessor or small data control unit F in a many-to-one manner; and the low frequency module D is served by the main processor. The classification further includes classifying dynamic changes of characteristics of the high frequency module, the medium frequency module and the low frequency module in different application scenarios, and a coprocessor service is turned on or off according to the scene requirements. When the low frequency module has an attribute of the high frequency module, a corresponding coprocessor service is added. The detailed design is as follows.

In a scene of a three-dimensional measurement chip, a key reference value of the depth image generating module 112 needs to be regularly refreshed by the system, so a frequent processing operation exists. The detailed operation is as follows. The main processor retrieves current state values of a depth image by interrupting a service program or regularly making a query, calculates the values, and allocates, through the bus 120, the calculated values to the depth image generating module for updating. The processing is frequent, so the depth image generating module 112 is defined to be a high frequency module. In a similar way, other data processing modules are classified. The image packaging module 113 is defined to be a high frequency module, the color image processing module 114 and the data packet output module 115 are defined to be medium frequency modules, and the post-processing module 116 is defined to be a low frequency module. The detailed design is as follows. Since work loads of the main processor are increased by the high frequency module and the medium frequency module, an EDA technology may be used to perform simulation verification on the modules. If it is found that the performance cannot satisfy design requirements, the performance of the main processor is improved by means of increasing a main frequency of the main processor and increasing the number of main processing cores, to satisfy the design requirements.

Step 3: Coprocessors are added on the system bus. The coprocessors or small data control units E and F are added on the system bus, can accept slave interfaces configured by the main processor, and have master interfaces for configuring the data processing units A, B and C. Interfaces of the coprocessors further include the master interfaces for configuring the data processing units A, B and C, but do not include the configured slave interfaces, so that the interfaces of the coprocessors can be fixed but are not opened to software for configuration in a processing process. The detailed design is as follows.

Figure 3:
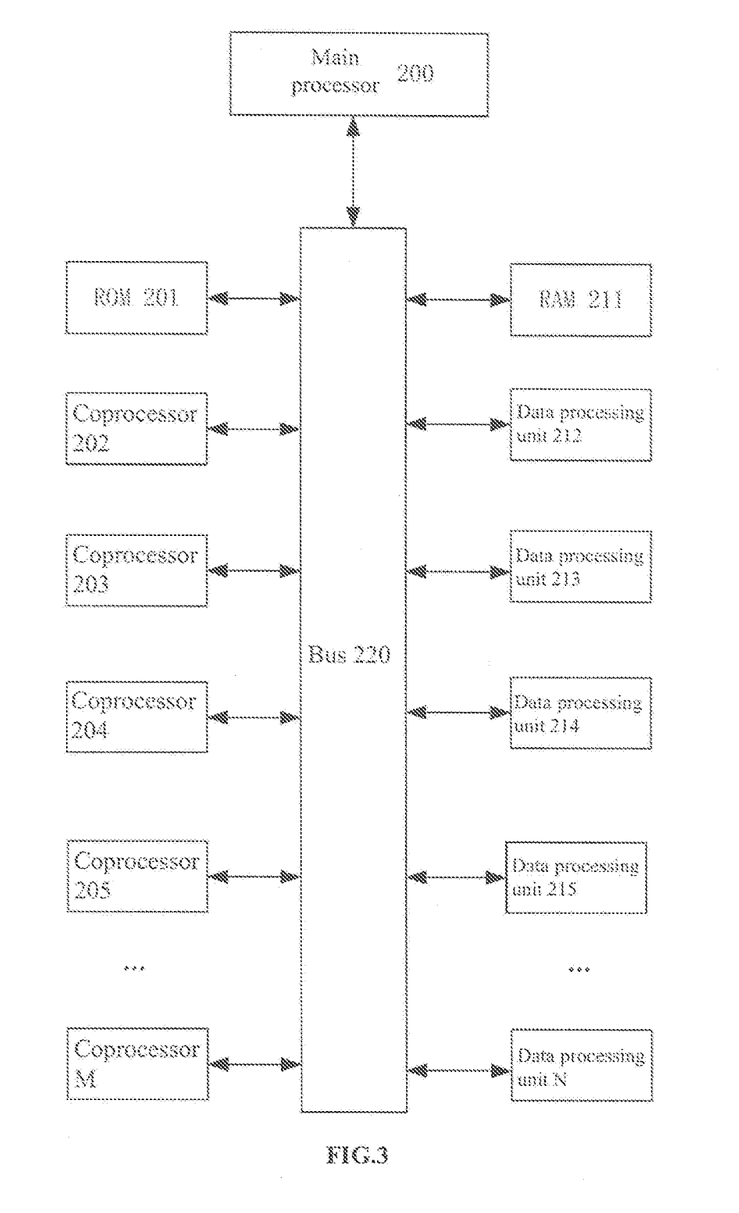
FIG. 3 is a schematic block diagram of a processor system with a single bus of the present invention.

Referring to FIG. 3, a data processing unit 212 is a depth image generating module, data processing units 214 and 215 are medium frequency modules. A special coprocessor 202 is added to specially perform a customized service for the depth image generating module 212. The coprocessor 202 is directly notified of an internal state of the module 212, calculates multiple sets of data according to a certain repeated condition, and then sends the calculated data to the depth image generating module 212 through the bus, to achieve the purpose of updating. In a high performance processing scene, the power consumption reduction function of the coprocessor is very obvious.

If other high frequency modules exist, coprocessors 203 and 204 are used to directly perform customized services without intervention of the main processor. For the medium frequency modules 214 and 215, a coprocessor 205 performs a semi-customized service and generates a semi-customized instruction applicable to the two modules. Therefore, the coprocessor 205 can serve the modules 214 and 215 with a little intervention of a main processor (the main processor 200 is required only in an initialization process or in the case of exception).

Step 4: A customized coprocessor or small data control unit is designed. A circuit structure of a coprocessor E is designed. With reference to an entry mode and processing process of the main processor for processing the module A, an entry mode signal and data are extracted and sent to the coprocessor E. The coprocessor E calculates the data and generates a processing timing similar to that of the main processor for the high frequency module A, to complete the whole process allocated to the high frequency module A. The coprocessor should generate an instruction consistent with that generated by the main processor and optimize the instruction, to generate a more efficient instruction. The coprocessor further includes a structure for controlling a related data processing unit through a bus manner for the main processor or special direct signal input and output. The entry mode of the coprocessor includes: an internal signal of a correspondingly served data processing unit, an internal signal of a non-correspondingly served data processing unit, or input and output signals of the chip. The detailed design is as follows.

Figure 4:
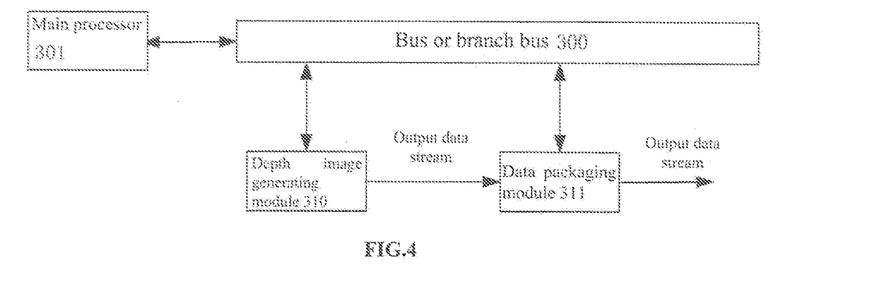
FIG. 4 is a schematic block diagram of a partial module interconnection structure before optimization.

FIG. 4 is a schematic diagram of a module interconnection structure without a coprocessor. Referring to FIG. 4, a depth image generating module 310 generates a data stream of a depth image and sends processed data to an image packaging module 311. Before power consumption optimization, when modules 310 and 311 process a certain volume of data, the main processor acquires internal states of the two modules by reading a register. When the states reach desired states, the main processor performs certain calculation processing on the acquired data and sends the calculated data to the depth image generating module 310 and the data packaging module 311 through the bus. Since the whole process is performed through software, multiple clock cycles are required to acquire and execute a single software instruction, resulting in poor efficiency and performance. Therefore, loads of the main processor are increased, and thus a frequency of the main processor generally must be increased to satisfy performance requirements.

Figure 5:
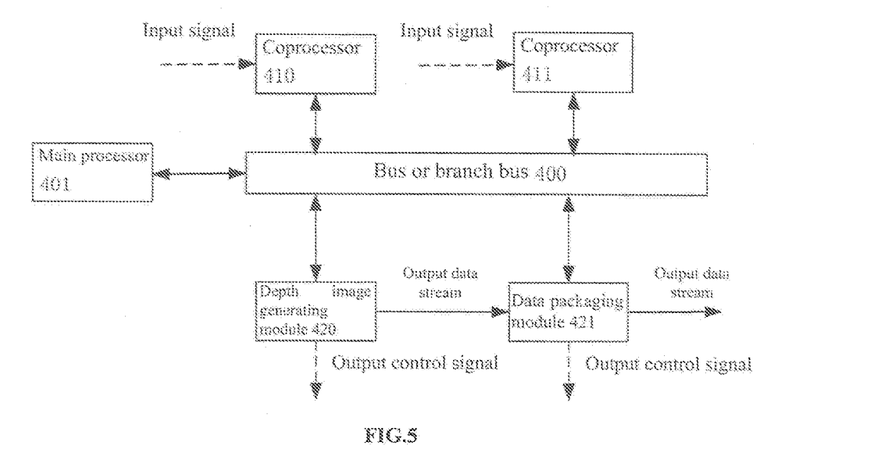
FIG. 5 is a schematic block diagram of a partial module interconnection structure of the present invention.

FIG. 5 is a schematic diagram of a module interconnection structure according to FIG. 4 after optimization performed by the method of the present invention. A coprocessor 410 and a coprocessor 411 are added to serve modules 420 and 421 respectively. For the simplification of description, in FIG. 4, a one-to-one service manner is used, that is, the coprocessor 410 serves the depth image generating module 420 and the coprocessor 411 serves the data packaging module 421. FIG. 5 is similar to FIG. 4, but the depth image generating module 310 and the data packaging module 311 are changed a bit, where information such as states and data to be detected is output to corresponding coprocessors (shown by dotted lines in FIG. 5), and a special control instruction and a special calculating unit core are added in the coprocessor to judge the received state and process the data before a next operation. In this case, in order to ensure consistency of operations of the modules 420 and 421, in the process of taking over the modules by the coprocessors, the main processor releases control on the module 420 and the module 421. Thus, in this case, with the same processing core, a small number of coprocessors are added to reduce a main frequency requirement of the main processor, thereby achieving the purpose of reducing power consumption of the chip.

Step 5: a semi-customized coprocessor or small data control unit is designed. A circuit structure of a coprocessor F is designed. According to step 3, considering configuration operations for the medium frequency modules B and C, a semi-common instruction is generated. The reducing the frequency of the main processor includes reducing the frequency of the main processor by a percentage corresponding to a reduction percentage of the loads of the main processor, and an optimal clock frequency is acquired by performing simulation verification on the chip system once or more than once. The detailed design is as follows. According to the foregoing steps, since the coprocessor unit is included in the hardware circuit, the changes of the software codes include: in the process of initialization of the chip, adding control on the coprocessor; and in actual work, bypassing control on the high frequency module and handing over the control to the coprocessor, and reducing or bypassing control on the medium frequency module.

Figure 6:
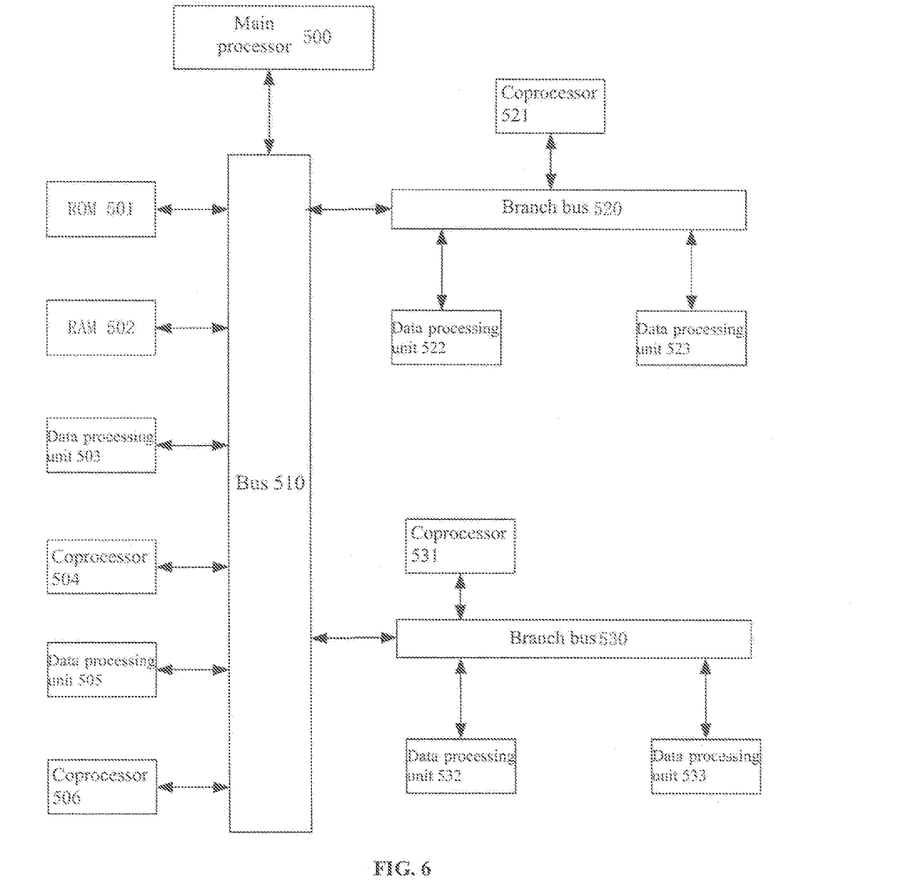
FIG. 6 is a schematic block diagram of a processor system with multiple buses of the present invention.

Step 6: Software codes are optimized and a clock frequency is reduced. In the software codes, processing programs of the main processor for the high frequency module A and the medium frequency modules B and C are closed, and a clock frequency of the main processor is reduced correspondingly according to a reduction of work loads of the main processor. The detailed implementation method is as follows. Since the structure of the whole chip is changed, simulation verification needs to be performed on the chip system through the EDA technology. The simulation process includes front-end simulation and rear-end simulation. The frequency of the main processor can be reduced by a percentage corresponding to a reduction ratio of work loads of the main processor. An optimal clock frequency can be acquired through multiple attempts of simulation verification. FIG. 6 is a schematic diagram of another bus structure of the present invention. In FIG. 6, a bus 510 and two low-speed buses 520 and 530 are marked. In actual bus design, two low-speed buses can work in different clock domains respectively to satisfy different processing performance requirements. In FIG. 6, a main processor 500 may manage, through the bus, all modules, including a ROM 501, a RAM 502, a data processing unit 503, a coprocessor 504, a data processing unit 505, a coprocessor 506, a coprocessor 521, a data processing unit 522, a data processing unit 523, a coprocessor 531, a data processing unit 532, and a data processing unit 533. In a low power consumption scene, the structure may be designed as follows. The coprocessor 504 corresponds to a control module of the data processing unit 503, and the coprocessor 506 corresponds to the data processing unit 505. The data processing units 522 and 523 corresponding to the branch bus 520 are medium access frequency modules, so the coprocessor 521 can control the two processing modules within the range of design performance or through time division multiplexing. For the branch bus 530, since the data processing unit 533 (for example, an image capturing part) can work independently without frequent intervention of the main processor, the data processing unit 533 is identified as a low access frequency module. For this kind of module, no special coprocessor module needs to be configured. When processing data, the data processing unit 532 occasionally requires the main processor to perform a burst operation, so a special coprocessor module 531 may be configured to take over calculation and access operations of the main processor in a burst process.

Step 7: The chip is verified to confirm that design requirements are satisfied. Simulation verification, specifically including Register Transfer Level (RTL) simulation and netlist level simulation, is performed on the chip system through the EDA technology, to ensure the correctness of functions.

Arrangements of the system and bus shown in the foregoing figures are all exemplary configurations and are merely shown for the purpose of describing concepts. In a specific embodiment, other appropriate configurations may also be used. Designations of the modules in the figures may also be marked in other similar or like descriptions.

Although the embodiments described in the present invention are directed to an SOC, the present invention is applicable to a plurality of integrated circuits or any inter-network system consisting of a plurality of integrated circuits.

Descriptions not involved in the detailed implementation of the present invention belong to technologies in the prior art and can be implemented with reference to the prior art.

Through repeated experimental verification, the present invention achieves a satisfied trial effect.

The foregoing detailed implementation and embodiments are provided to specifically support the technical ideas of the design method of achieving low power consumption of a three-dimensional measurement chip provided by the present invention, but not to limit the protection scope of the present invention. All equivalent changes or modifications made on the basis of the present technical solution according to the technical ideas provided by the present invention fall within the protection scope of the technical solution of the present invention.

What is claimed is:

1. A method of manufacturing a three-dimensional measurement chip for achieving low power consumption, the method comprising the following steps:
    step 1: determining a system structure of the three-dimensional measurement chip, wherein the system structure comprises a main processor, a main storage, a read-only memory (ROM), and data processing units, connected to each other by a standard system bus, an interface distributed to the main processor is a master interface, and interfaces distributed to other modules are slave interfaces, and wherein each of the data processing units is instruction loaded from a memory and executed by the main processor;
    step 2: classifying the data processing units into a high frequency module A, medium frequency modules B and C, and a low frequency module D according to processing frequencies of the main processor for the data processing units;
    step 3: connecting a first coprocessor and a second coprocessor to the system bus, wherein the coprocessors are slave to the main processor and master to the high frequency module A and the medium frequency modules B and C;
    step 4: designing the first coprocessor customized to process the high frequency module A, wherein with reference to an entry mode and processing process of the main processor for processing the high frequency module A, an entry mode signal and data are extracted and sent to the first coprocessor, and the first coprocessor calculates the data and generates a processing timing similar to that of the main processor for the high frequency module A, to complete an allocation of a whole process of the high frequency module A to the first coprocessor;
    step 5: designing a second coprocessor customized for processing the medium frequency modules B and C, and wherein according to requirements of step 3, considering configuration operations for the medium frequency modules B and C, a semi-common instruction is generated; and
    step 6: optimizing software codes and reducing a clock frequency of the main processor, a clock frequency of the main processor is reduced correspondingly according to a reduction of work loads of the main processor, wherein the data processing unit corresponding to high frequency module A is assigned to the first coprocessor in a one-to-one manner where the high frequency module A is served by the first coprocessor, the data processing unit corresponding to the medium frequency modules B and C are assigned to the second coprocessor in a many-to-one manner where the medium frequency modules B and C are served by the second coprocessor, and the data processing unit corresponding to low frequency module D is assigned to the main processor,
    wherein the classification in step 2 further comprises classifying dynamic changes of characteristics of the high frequency module A, the medium frequency modules B and C and the low frequency module D in different application scenarios, a coprocessor service is turned on or off according to scene requirements, and when the low frequency module D has an attribute of the high frequency module A, a corresponding coprocessor service is added.

2. The method for achieving low power consumption of a three-dimensional measurement chip according to claim 1, wherein the main processor in step 1 comprises a single-core processor or a multi-core processor, that is, a processor with different cores.

3. The method for achieving low power consumption of a three-dimensional measurement chip according to claim 1, wherein the data processing units in step 1 comprise a color image processing module, a depth image processing module, an image compressing module, an image packaging module, a pre-processing module, and post-processing module.

4. The method for achieving low power consumption of a three-dimensional measurement chip according to claim 1, wherein interfaces of the coprocessors in step 3 further comprise master interfaces for configuring data processing units A, B and C, but do not comprise the slave interfaces configured by the main processor, so that interfaces of the coprocessors are capable of being fixed but are not opened to software for configuration in a processing process.

5. The method for achieving low power consumption of a three-dimensional measurement chip according to claim 1, wherein the first coprocessor in step 4 further generates an instruction consistent with the semi-common instruction generated by the main processor and optimizes the instruction, to generate a more efficient instruction.

6. The method for achieving low power consumption of a three-dimensional measurement chip according to claim 1, wherein the coprocessor in step 4 further comprises a structure for controlling a related data processing unit through a bus manner for the main processor or special direct signal input and output.

7. The method for achieving low power consumption of a three-dimensional measurement chip according to claim 1, wherein the entry mode signal sent to the first coprocessor in step 4 comprises: an internal signal of a correspondingly served data processing unit, an internal signal of a non-correspondingly served data processing unit, or input and output signals of the three-dimensional measurement chip.

8. The method for achieving low power consumption of a three-dimensional measurement chip according to claim 1, wherein the reducing the frequency of the main processor in step 6 comprises reducing the frequency of the main processor by a percentage corresponding to a reduction percentage of the loads of the main processor, and an optimal clock frequency is acquired by performing simulation verification on the three-dimensional measurement chip once or more than once.

9. The method for achieving low power consumption of a three-dimensional measurement chip according to claim 1, wherein a simulation verification is performed on the three-dimensional measurement chip through an Electronic Design Automation (EDA) technology as to confirm that the three-dimensional measurement chip satisfies design requirements, wherein the EDA technology comprises Register Transfer Level (RTL) simulation and netlist level simulation.

* * * * *